Sept. 16, 1924.

E. B. THOMAS

ELECTRODE HOLDER

Filed Feb. 28, 1923

1,509,006

Inventor

E. B. Thomas.

By Lacey & Lacey, Attorneys

Patented Sept. 16, 1924.

1,509,006

UNITED STATES PATENT OFFICE.

EARL B. THOMAS, OF ATLANTIC CITY, NEW JERSEY.

ELECTRODE HOLDER.

Application filed February 28, 1923. Serial No. 621,870.

*To all whom it may concern:*

Be it known that I, EARL B. THOMAS, citizen of the United States, residing at Atlantic City, in the county of Atlantic and State of New Jersey, have invented certain new and useful Improvements in Electrode Holders, of which the following is a specification.

This invention relates to an improved electrode holder especially designed for low voltage soldering purposes and seeks, as one of its principal objects, to provide a holder wherein heating of the holder will be reduced to a minimum.

A further object of the invention in this connection, is to provide a holder wherein the lead wire of the device will be connected to the holder as near as possible to the point of the electrode, thereby tending to prevent heating of the holder.

Another object of the invention is to provide a holder wherein the shank of the device will be formed to admit of a circulation of air therethrough cooling the shank while the shank will also be of restricted proportions for further tending to prevent the conduction of heat from the electrode to the handle of the holder.

And the invention has as a still further object to provide a holder which will be of particularly simple construction but which, in practical use, will prove entirely efficient.

Other and incidental objects will appear hereinafter.

Figure 1:
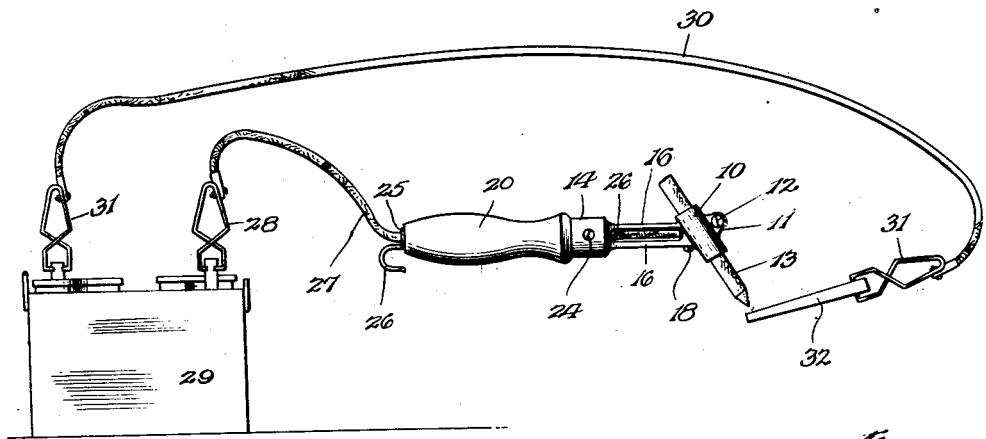
Figure 1 is a side elevation showing my improved holder in use.
Figure 4:
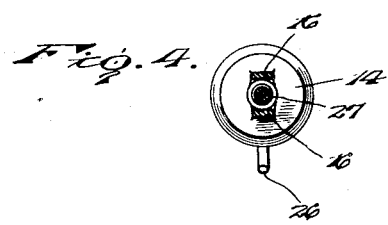
Figure 4 is a detail sectional view on the line 4—4 of Figure 2, looking in the direction of the arrows.
Figure 2:
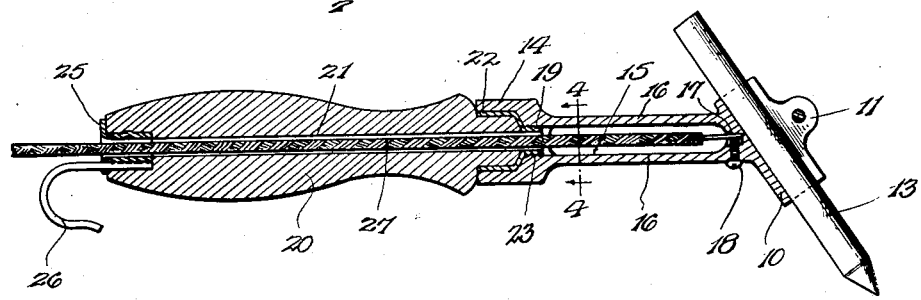
Figure 2 is a longitudinal sectional view through the device.
Figure 3:
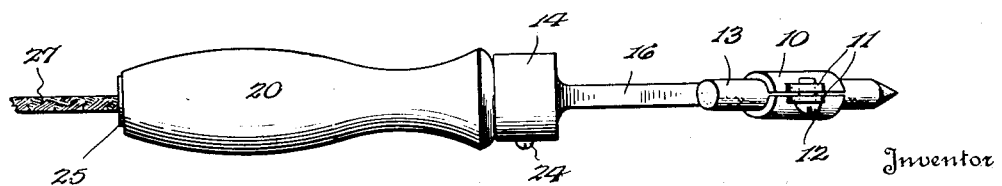
Figure 3 is a top plan view of the holder.

In carrying the invention into effect, I employ a longitudinally split clamping sleeve 10 provided with mating ears 11 with which is associated a clamp screw 12 adjustable for clamping an electrode, as conventionally illustrated at 13, in the sleeve. Integrally formed on the sleeve opposite the ears 11, is a laterally directed shank terminating in a socket 14 and slotted longitudinally throughout the major portion of its length, as indicated at 15, to define spaced parallel bars 16. These bars are of only slight proportions and are purposely of a weight only sufficient to withstand any reasonable strains to which said bars will likely be subjected in the practical use of the device. The object sought is to correspondingly reduce the conduction of heat from the electrode through the bars to the socket 14 and consequently to the handle of the device while, at the same time, free circulation of air will be permitted through the slot 15 between and around the bars for cooling the bars. Formed in the sleeve 10 at the inner end of the slot 15, is a socket 17 into which projects a binding screw 18 threaded through the lowermost of said bars and formed through the bottom wall of the socket 14 into the outer end of said slot is a threaded bore 19. Detachably connected with the shank is a handle 20 of wood or other approved material. This handle is provided with an opening 21 therethrough and fixed upon the inner end of the handle is a ferrule 22 snugly fitting in the socket 14 and terminating in a nipple 23 threaded into the bore 19 mounting the handle, the socket carrying a set screw 24 detachably securing the handle in position. Sunk into the handle at its outer end is a thimble 25 which preferably carries a suspension hook 26 for the device and extending through said thimble, through the opening 21 of the handle, and through the slot 15 of the shank is a lead wire 27, the bare inner end of which is secured in the socket 17 of the sleeve 10 by the binding screw 18. At its outer end, the lead wire is preferably equipped with an appropriate clip 28.

In Figure 1 of the drawings, I have illustrated the manner in which my improved device may be employed in conjunction with an ordinary storage battery for effecting a soldering operation, a battery being conventionally illustrated at 29. For this purpose, I employ an auxiliary lead 30 provided at its ends with suitable clips 31, one of which is engaged with one terminal of the battery while the other is engaged with the work, as suggested at 32, on which it is desired to accomplish the soldering operation. As shown, the clip 28 of the device is engaged with the other terminal of the battery, when the electrode 13 may be applied to the work at the point where heat is desired. Thus, a circuit will be closed through the electrode with the result that the electrode will become heated at the point thereof heating the work and, in this connection, attention is directed to the fact that the lead wire 26 of the device is connected directly to the clamp sleeve 10 and as near as practicable to the point of the electrode. Consequently, the tendency of the sleeve to heat with a resultant conduction of the heat to the shank and handle of the device will be reduced to a minimum.

Having thus described the invention, what is claimed as new is:

1. An electrode holder including a skeleton shank terminating at one end in a split sleeve to removably receive an electrode and at its opposite end in a socket to removably receive a handle, and a handle engaged in said socket.

2. An electrode holder including spaced bars forming a shank terminating at one end in a split sleeve to removably receive an electrode and at its opposite end in a socket to removably receive a handle, and a handle engaged in said socket.

3. An electrode holder including spaced bars forming a shank terminating at one end in a split sleeve to removably receive an electrode and at its opposite end in a socket to removably receive a handle, and a handle engaged in said socket and provided with a bore therethrough to receive a conductor lead extending between the bars of the shank and connected to said sleeve whereby the portion of said lead lying between the handle and sleeve between the bars will be shielded and protected by the bars.

In testimony whereof I affix my signature.

EARL B. THOMAS. [L. S.]